Aug. 8, 1961     A. J. HAMMOND     2,994,907

HINGE DEVICE

Filed Aug. 24, 1959     2 Sheets-Sheet 1

ALBERT J. HAMMOND
INVENTOR.

BY *John R. Faulkner*
*John J. Roethel*

ATTORNEYS

Aug. 8, 1961  A. J. HAMMOND  2,994,907
HINGE DEVICE

Filed Aug. 24, 1959  2 Sheets-Sheet 2

ALBERT J. HAMMOND
INVENTOR.

BY John R. Faulkner
John J. Roethel

ATTORNEYS

_United States Patent Office_

2,994,907
Patented Aug. 8, 1961

2,994,907
HINGE DEVICE
Albert J. Hammond, Dearborn, Mich., assignor to Ford Motor Company, Dearborn, Mich., a corporation of Delaware
Filed Aug. 24, 1959, Ser. No. 835,735
8 Claims. (Cl. 16—128.1)

This invention relates generally to hinges for automotive vehicles.

More particularly, the hinge embodying the present invention is adapted to mount a closure structure, such as an engine compartment hood, for simultaneous swinging and bodily shiftable movement relative to a substantially horizontal fixed hinge axis, the hinge having incorporated therein suitable counterbalance spring means for holding the closure structure in an open position.

It is conventional practice to provide motor vehicles with an engine compartment closure structure or hood which is latched at the front and which is hinged on hinge devices mounted on a transverse frame structure defining the rear of the engine compartment. The transverse hinge axis defined by the hinge devices generally is forward of the rear edge of the closure structure or hood, the rear portion of the latter overlying a forward portion of the body structure, such as the cowl, to the rear of the engine compartment. As a result, the hinge devices must be constructed and arranged to impart a compound motion to the hood as it is raised at its front end. The motion must be such that the rear edge of the hood is raised from and has no interference with the underlying body structure as the hood is swung or tilted about its hinge axis to a fully open position.

It is an object of the present invention to provide a simple, efficient and economical hinge device adapted to function in the manner set forth above.

The hinge device embodying the present invention comprises a support bracket having a longitudinally extending support member. The support member is adapted to be secured in a suitable manner to a transverse frame member such as the front wall of the cowl structure, which wall separates the engine compartment from the passenger compartment. A pair of divergent links or arms are each pivotally supported at one of their ends on the support member. The links or arms are swingable about spaced pivot axes, the axis of the one link or arm being spaced above the other. A control means is provided which couples the links or arms together between their pivot axes and is effective to transmit movement of the one to the other. The links or arms are swingable in opposite directions with the free ends thereof being raised as the hood is opened. A hood attachment member is pivotally connected to the free end of one of the links or arms. A connecting link couples the hood attachment member to the free end of the other link or arm. The connecting link is pivotally connected at one of its ends to the hood attachment member and at its other end to the other link or arm. The connecting link is longer than the link or arm which is directly connected to the hood attachment member and is bodily shiftable by the link or arm to which it is connected as the link or arm which is connected to the attachment member swings through a fixed arc. The movement of the attachment member which results from such construction and arrangement is such that a hood structure mounted thereon is longitudinally shifted forwardly or rearwardly as it is swung to or from an open or closed position, respectively.

Other objects, advantages and features of the present invention will be made more apparent as the description proceeds, particularly when considered in connection with the accompanying drawings, wherein.

Figure 1:
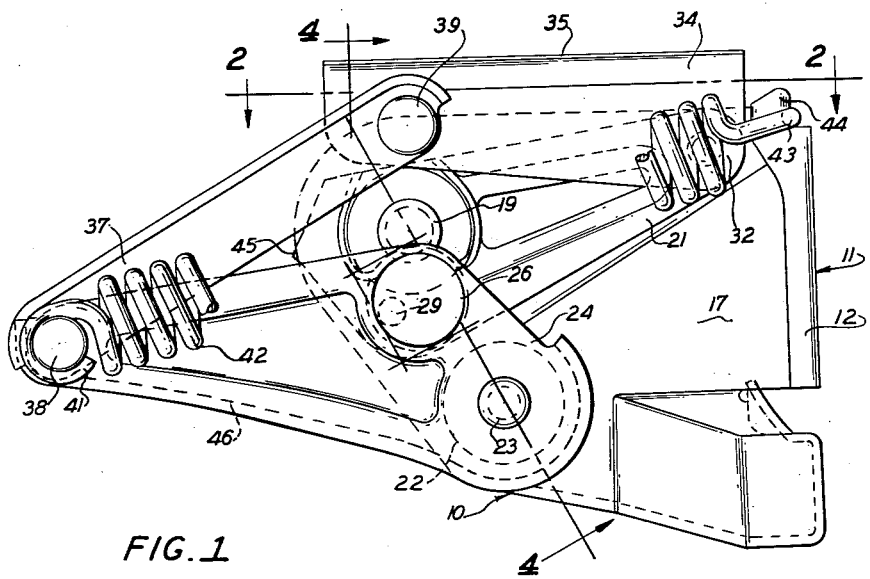
FIG. 1 is a side elevation of the hinge assembly as it appears in lowered or closed position of the closure structure or hood.

Referring now to the drawings, and particularly to FIG. 1, there is illustrated a hinge assembly, generally designated 10, adapted to mount a closure structure, such as a hood or the like on a vehicle body. The hood (not shown) is of the type adapted to be opened from its forward edge and is hinged adjacent its rear edge by means of a pair of the hinge assemblies 10, one located adjacent each side of the hood. Inasmuch as each of the hinge assemblies 10 are of symmetrical construction, only one will be described in detail.

Figure 2:
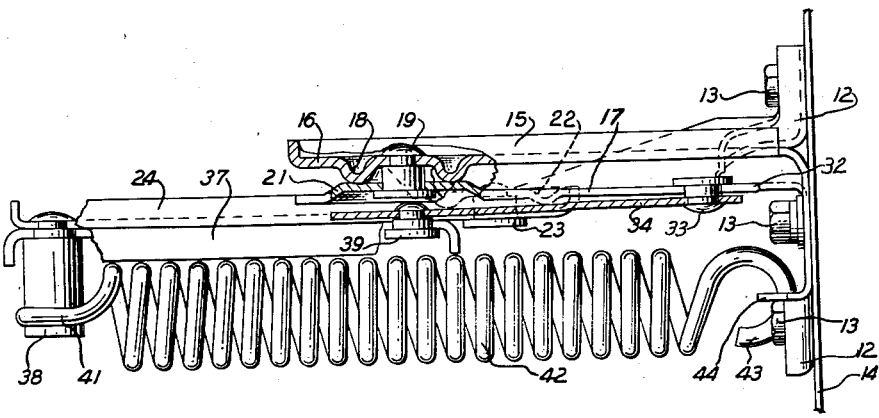
FIG. 2 is a sectional view taken substantially through the line 2—2 of FIG. 1 looking in the direction of the arrows.
Figure 3:
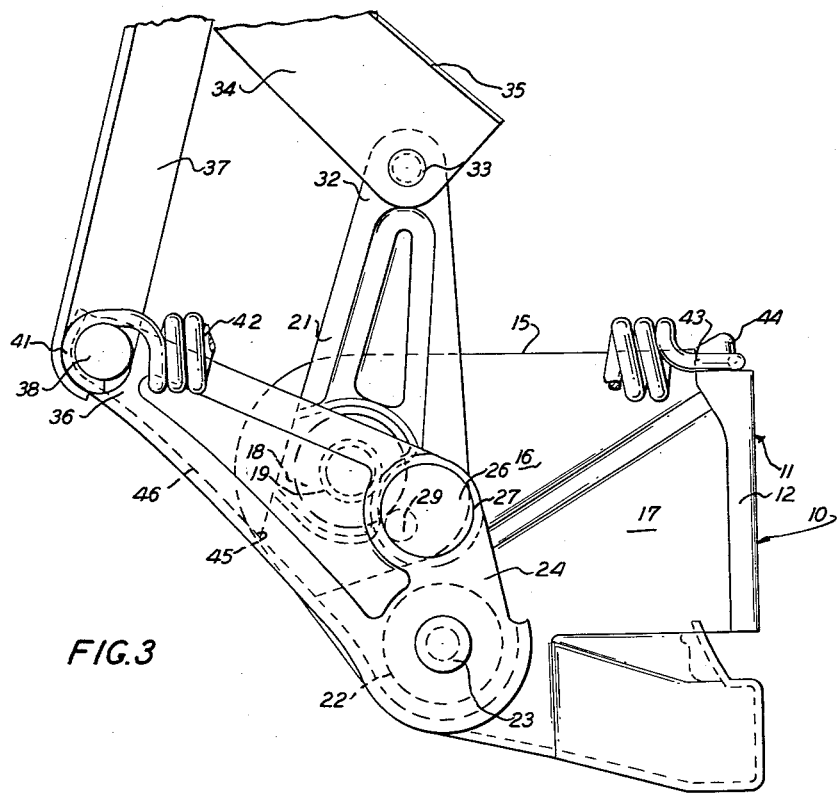
FIG. 3 is a view in part similar to FIG. 1 illustrating the hinge assembly when the closure structure or hood is in a raised or open position.
Figure 4:
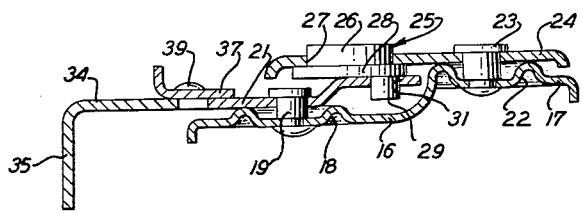
FIG. 4 is a sectional view taken substantially through the line 4—4 of FIG. 1 looking in the direction of the arrows.

A hinge assembly 10 comprises a bracket 11 having a flange 12 adapted to be secured by bolts 13 (see FIG. 2) or other suitable securing means to a transverse frame member 14 defining an end wall of the compartment to be closed by the hood. The main plate portion 15 of the bracket 11 extends in a longitudinally forward direction. The main plate portion 15 is divided into two laterally offset portions 16 and 17, respectively, the line of division extending substantially diagonally across the plate portion, as best seen in FIGS. 3 and 4.

At its upper forward or left-hand corner, as viewed in FIG. 1, the main plate portion 15 of the bracket 11 is provided with an embossed portion 18. Pivotally mounted on this embossed portion by a pivot pin 19 is a link or arm 21. The main plate portion 15 is provided with a second embossed portion 22 located below and rearwardly of the embossed portion 18. Pivotally mounted on this latter embossed portion by a pivot pin 23 is a second link or arm 24. It will be noted that the embossed portion 18 is located on the offset plate portion 16 and the embossed portion 22 on the offset plate portion 17. The two links or arms 21 and 24 are thus mounted for swinging movement in laterally offset parallel planes.

The links or arms 21 and 24 have overlapping portions (see FIGS. 1 and 3) which are suitably apertured to receive a coupling device, generally designated 25, which correlates swinging movement of the two arms relative to one another. The coupling device 25 comprises a specially shaped pin having a first cylindrical portion 26 journalled in an aperture 27 in the link or arm 24. The pin is further provided with a plate or shoulder portion 28 adapted to act as a spacer between the links or arms 21 and 24 and also as a retention means holding the coupling device or pin 25 in position between the links or arms. On the side of the plate or shoulder portion 28 opposite the cylindrical portion 26, the pin 25 is provided with a second cylindrical portion 29 received in an aperture 31 in the link or arm 21. The second cylindrical portion 29 of the pin 25 is substantially smaller in diameter than the cylindrical portion 26 and is eccentrically offset. This eccentric relationship is best seen in FIG. 4 in which the pin 25 has been rotated approximately 90 degrees from true position to emphasize the eccentricity. The effect of this construction and arrangement on the operation of the hinge will hereinafter be explained.

The free end 32 of the link or arm 21 is pivotally connected by a suitable pivot stud 33 or the like to the vertical flange 34 of a hood attachment bracket 35. The free end 36 of the link or arm 24 is also connected to the hood attachment bracket 35 but through the intermediary of a connecting link 37. The link 37 is pivotally connected at one of its ends by a pivot stud or the like 38 to the free end 36 of the link or arm 24 and at its other end by a pivot stud or the like 39 to a point on the flange 34 of the hood attachment bracket 35. The pivot axis of the stud 39 is spaced from and parallel to the pivot axis of the stud 33 connecting the free end 32 of the arm 21 to the hood attachment bracket flange 35. The pivot stud 38 is somewhat elongated (see FIG. 2) to provide an achnor for an end loop 41 of a coiled counterbalanced spring 42. The other end loop 43 of the spring 42 is hooked over a notched portion 44 of the bracket flange 12.

To complete the physical description of the hinge assembly 10, it will be noted that the arm 21 is provided at the left end thereof as viewed in FIG. 1, with a straight edge portion 45. The straight edge portion 45 is adapted to abut the inner surface of a flange 46 on the link or arm 24 to provide a positive stop limiting the upward swinging movement of the hood (see FIG. 3).

It will be noted from an examination of FIG. 1, which shows the hinge assembly in the position it occupies when the hood is closed, that the link or arm 21 extends toward the flange 12 or rearwardly at a slightly upwardly inclined angle to the horizontal or longitudinal axis on the hinge assembly. The link or arm 24 extends away from the flange 12 or forwardly, also at a slightly upwardly inclined angle relative to the horizontal or longitudinal axis of the hinge assembly. The links or arms 21 and 24 are thus in diverging relationship to each other in closed position of the hood. The longitudinal axis of the coil spring 42 passes slightly below the pivot axis 19 of the arm 21 but lies above the pivot axis 23 of the arm 24. In this position the spring effect is substantially neutralized, the spring exerting neither an opening or closing force on the hood.

To open the hood or closure structure, it is first unlatched at its free or front end, the end opposite that to which the hinge devices are attached. After being unlatched the free or front end may be manually raised. As soon as the free or front end of the hood begins to move upwardly, the links or arms of the hinge assembly come into play. The link or arm 21 swings in a counterclockwise direction, as viewed in FIG. 1 about its pivot axis 19. It will be readily apparent that the link or arm 21 in swinging upwardly and forwardly tends to cause the rear end of the hood attachment bracket 35 to be urged upwardly and forwardly, also. The raising of the hood might be considered only with respect to the link or arm 24 and the link 37 connected thereto. As the front end of the hood is raised, assuming that the link or arm 21 is fixed, the hood attachment bracket 35 would pull upwardly on the link 37, which upward movement would be transmitted to the link or arm 24 causing the latter to be swung upwardly in a clockwise direction about its pivot axis 23. However, because of the eccentric coupling device 25 between the overlapping portions of the arms or links 21 and 24, regardless of which link might be considered to be first influenced by the upward movement of the front end of the closure structure or hood, the other link must respond to such movement. Thus the hood attachment bracket 35, and therefore the closure structure or hood mounted thereon, must move in a predetermined path. As seen in FIG. 3, this movement must be such that the hood attachment member 35 is moved forwardly of its closed position and is simultaneously raised upwardly. However, since its rear end is moving about a fixed pivot axis and its front end is moving about the fixed axis 23 of the arm 24 and also with respect to the moving pivot connection 38 between the arm 24 and link 37, the front end of the attachment bracket is raised upwardly higher than its rear end. It is believed apparent that the stability of the hinge assembly is dependent on the coupling device 25 which connects the upper and lower arms 21 and 24 in such a manner that the movement of the one will transfer motion to the other. Since the two arms are moving about different centers, it is necessary for the coupling device 25 to be an eccentric device as illustrated to permit it to compensate or adjust itself as the arms or links 21 and 24 swing.

It will be noted that the raising of the hood causes the coil spring 42 to be raised from the position shown in FIG. 1 to the position shown in FIG. 3. In this latter position, the longitudinal axis of the coil spring is above the pivot axis 19 and tends to pull the pivotal connection 38 between the link 37 and the arm 24 toward the flange 12. In so doing, it exerts an upward force on the connecting link 37 which tends to keep the hood attachment bracket 35 and therefore the hood mounted thereon in a raised position.

The closing movement of the hinge assembly is a reverse of its opening movement. To close the hood, it is merely necessary to exert enough manual force on the free end or open end of the hood or closure structure sufficient to overcome the force of the spring 42 tending to maintain the hood structure in an open position. The coupled links or arms 21 and 24 control the movement of the hood structure so that it swings downwardly as it simultaneously moves rearwardly into closed position.

It will be understood that the invention is not to be limited to the exact construction shown and described, but that various changes and modifications may be made without departing from the spirit and scope of the invention as defined in the appended claims.

What is claimed is:

1. A hinge device for the hood of a motor vehicle comprising a support bracket having a longitudinally extending support member, a pair of divergent links each pivotally supported at one of their ends on said support member, the pivot axes of said links being spaced one above the other, said links having overlapping portions between the pivot axes thereof, control means including a first cylindrical portion connected to one of said overlapping portions, a second cylindrical portion connected to the other of said overlapping portions, and spacer means interposed between said overlapping portions coupling said cylindrical portions to each other, the axes of said cylindrical portions being laterally displaced relative to one another, the axis of said one cylindrical portion being movable about the axis of the other cylindrical portion as said control means correlates swinging movement of said divergent links relative to one another as said divergent links swing about their respective pivot axes, said links being swingable in opposite directions with the free ends thereof being raised as said hood is opened, a hood attachment member pivotally connected to the free end of one of said links, a connecting link pivotally connected at one end to the other end of said hood attachment member and at its other end to the free end of said other link, said connecting link being longer than said one link and bodily shiftable by said other link as said one link swings through a fixed arc, the resultant attachment member movement being such that the hood structure mounted thereon is longitudinally shifted as it is swung to or from an open or closed position.

2. A hinge device for a compartment closure structure comprising a support having a longitudinally extending support member, a pair of links each pivotally supported at one of their ends on said support member, the pivot axes of said links being spaced from each other, said links extending in opposite directions relative to one another in a closed position of the closure structure with the longitudinal axis of each link being at a slight angle to the longitudinal axis of said support member, control means operatively coupling said links between the pivot axes thereof for correlated swinging movement in opposite directions, said control means comprising a member rotatably journalled in one of said links and having an eccentric projection rotatably coupled to the other of said links, the angular displacement of said links relative to one another being decreased as said closure structure is moved toward an open position, a closure structure attachment member pivotally connected to the free end of one of said links, a connecting link pivotally connected at one of its ends to the free end of the other link and at its other end to the other end of said attachment member, the construction and arrangement of said links being such that said attachment member substantially parallels the longitudinal axis of said support member in closed position of said closure structure, said one end of said attachment member swinging in a fixed arc about the pivot axis of said one link as the other end thereof moves through a curved path, the resultant movement of said attachment member being such that a closure structure mounted thereon is longitudinally shifted as it is swung from an open to a closed position or from a closed to an open position.

3. A hinge device for the hood of a motor vehicle comprising a support bracket having a longitudinally extending support member, a pair of divergent links each pivotally supported at one of their ends on said support member, the pivot axes of said links being spaced one above the other, control means coupling said links between the pivot axes thereof and effective to transmit movement of the one link to the other, said control means comprising a member rotatably journalled in one of said links and having an eccentric projection rotatably coupled to the other of said links, said links being swingable in opposite directions with the free ends thereof being raised as said hood is opened, a hood attachment member pivotally connected to the free end of one of said links, a connecting link pivotally connected at one end to the other end of said hood attachment member and at its other end to the free end of said other link, said connecting link being longer than said one link and bodily shiftable by said other link as said one link swings through a fixed arc, the resultant attachment member movement being such that the hood structure mounted thereon is longitudinally shifted as it is swung to or from an open or closed position.

4. A hinge device for the hood of a motor vehicle comprising a support bracket having a longitudinally extending support member, a pair of divergent links each pivotally supported at one of their ends on said support member, the pivot axes of said links being spaced one above the other, control means coupling said links between the pivot axes thereof and effective to transmit movement of the one link to the other, said control means comprising an eccentric member having a main body portion rotatably journalled in one of said links and having an eccentric projection rotatably journalled in the other of said links, said links being swingable in opposite directions with the free ends thereof being raised or lowered as the hood is respectively raised or lowered, a hood attachment member pivotally connected to the free end of one of said links, a connecting link pivotally connected at one end to the other end of said hood attachment member and at its other end to the free end of said other link, said other link and said connecting link being effective to swing said hood attachment member about its pivotal connection with said one link as the latter travels through a fixed radial path, the resultant hood attachment member movement being a combined tilting and bodily shiftable movement as the hood structure mounted thereon is raised or lowered.

5. A hinge device for the hood of a motor vehicle comprising a support bracket having a longitudinally extending support member, an upper and a lower support arm each pivotally supported at one of their ends on said support member, the pivot axes of said upper arm being spaced above and forwardly of the pivot axis of said lower arm, said arms extending in divergent directions relative to one another in a closed position of the hood, said arms having overlapped portions between the pivot axes thereof, control means including a first cylindrical portion connected to one of said overlapping portions, a second cylindrical portion connected to the other of said overlapping portions, and spacer means interposed between said overlapping portions coupling said cylindrical portions to each other, the axes of said cylindrical portions being laterally displaced relative to one another, the axis of said one cylindrical portion being movable about the axis of the other cylindrical portion as said control means correlates swinging movement of said upper and lower arms relative to one another as said arms swing about their respective pivot axes, said control means causing said arms to swing in opposite directions about their respective pivot axes with the free ends being raised or lowered as the hood is respectively raised or lowered, a hood attachment member pivotally connected to the free end of said upper arm, a connecting link pivotally connected at one end to the other end of said hood attachment member and at its other end to the free end of said lower arm, said link and lower arm being effective to swing said hood attachment member about its pivotal connection with said upper arm as the latter travels through a fixed radial path as said hood is raised or lowered, the resultant movement of said hood being a combined tilting and bodily shiftable movement to and from a raised or lowered position, respectively.

6. A hinge device for the hood of a motor vehicle comprising a support bracket having a forwardly longitudinally extending support member, an upper and a lower support arm each pivotally supported at one of their ends on said support member, the pivot axes of said upper arm being spaced above and forwardly of the pivot axis of said lower arm, said arms extending in opposite directions relative to one another in a closed position of the hood, said arms having overlapping portions between the pivot axes thereof, control means coupling said overlapping portions effective to transmit movement of the one link to the other, said control means comprising an eccentric means self-positionable to correlate swinging movement of said upper and lower arms relative to one another as said arms swing about their respective pivot axes, said control means causing said arms to swing in opposite directions about their respective pivot axes with the free ends being raised or lowered as the hood is respectively raised or lowered, a hood attachment member pivotally connected to the free end of said upper arm, a connecting link pivotally connected at one end to the other end of said hood attachment member and at its other end to the free end of said lower arm, said link and lower arm being effective to swing said hood attachment member about its pivotal connection with said upper arm as the latter travels through a radial path as said hood is raised or lowered, the resultant movement of said hood being a combined tilting and bodily shiftable movement to and from a raised or lowered position, respectively.

7. A hinge device for the hood of a motor vehicle comprising a support bracket having a longitudinally extending support member, an upper and a lower support arm each pivotally supported at one of their ends on said support member, the pivot axes of said upper arm being spaced above and forwardly of the pivot axis of said lower arm, said arms extending in opposite directions relative to one another in a closed position of the hood, said arms having overlapping portions between the pivot axes thereof, control means coupling said overlapping portions effective to transmit movement of the one link to the other, said control means comprising an eccentric means self-positionable to correlate swinging movement of said upper and lower arms relative to one another as said arms swing about their respective pivot axes, said eccentric means having a first part rotatably journalled in one of said arms and an eccentric part rotatably journalled in the other of said arms, said control means causing said arms to swing in opposite directions about their respective pivot axes with the free ends being raised or lowered as the hood is respectively raised or lowered, a hood attachment member pivotally connected to the free end of said upper arm, a connecting link pivotally connected at one end to the other end of said hood attachment member and at its other end to the free end of said lower arm, said link and lower arm being effective to swing said hood attachment member about its pivotal connection with said upper arm as the latter travels through a radial path as said hood is raised or lowered, the resultant movement of said hood being a combined tilting and bodily shiftable movement to and from a raised or lowered position, respectively.

8. A hinge device for the hood of a motor vehicle comprising a support bracket having a longitudinally extending support member, an upper and a lower support arm each pivotally supported in divergent relationship at one of their ends on said support member, the pivot axes of said upper arm being spaced above and forwardly of the pivot axis of said lower arm, the longitudinal axis of each arm being at a slightly raised angle to the longitudinal axis of said support member, said arms having overlapping portions between the pivot axes thereof, control means coupling said overlapping portions effective to transmit movement of the one link to the other, said control means comprising an eccentric means self-positionable to correlate swinging movement of said upper and lower arms relative to one another as said arms swing about their respective pivot axes, said eccentric means having a first part rotatably journalled in one of said arms and an eccentric part rotatably journalled in the other of said arms, said control means causing said arms to swing in opposite directions about their respective pivot axes with the free ends being raised or lowered as the hood is respectively raised or lowered, a hood attachment member pivotally connected to the free end of said upper arm, a connecting link pivotally connected at one end to the other end of said hood attachment member and at its other end to the free end of said lower arm, said link and lower arm being effective to swing said hood attachment member about its pivotal connection with said upper arm as the latter travels through a predetermined radial path as said hood is raised or lowered, the resultant movement of said hood being a combined tilting and bodily shiftable movement to and from a raised or lowered position, respectively.

References Cited in the file of this patent
UNITED STATES PATENTS
2,683,280    Martens _____ July 13, 1954